United States Patent
Richman

(10) Patent No.: US 10,809,889 B2
(45) Date of Patent: Oct. 20, 2020

(54) LIVE INTERACTIVE EVENT INDICATION BASED ON NOTIFICATION PROFILE FOR DISPLAY DEVICE

(71) Applicant: Sony Corporation, Tokyo (JP)

(72) Inventor: Steven Martin Richman, San Diego, CA (US)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 15/912,963

(22) Filed: Mar. 6, 2018

(65) Prior Publication Data

US 2019/0278439 A1    Sep. 12, 2019

(51) Int. Cl.
G06F 3/0484    (2013.01)

(52) U.S. Cl.
CPC .................. G06F 3/0484 (2013.01)

(58) Field of Classification Search
None
See application file for complete search history.

(56) References Cited

U.S. PATENT DOCUMENTS

| | | | |
|---|---|---|---|
| 2002/0129383 A1* | 9/2002 | Wasilewski | H04N 5/782 725/139 |
| 2002/0158878 A1* | 10/2002 | Smirnov | G11B 20/10 345/545 |
| 2009/0167553 A1* | 7/2009 | Hong | G06Q 10/02 340/4.61 |
| 2009/0217317 A1* | 8/2009 | White | G06Q 30/02 725/32 |
| 2009/0254931 A1 | 10/2009 | Pizzurro et al. | |
| 2014/0317543 A1* | 10/2014 | Kim | G06F 3/04817 715/765 |
| 2015/0088622 A1* | 3/2015 | Ganschow | G06Q 50/01 705/14.5 |
| 2015/0121411 A1 | 4/2015 | Ekselius et al. | |
| 2016/0105540 A1* | 4/2016 | Kwon | H04N 21/41407 715/747 |
| 2016/0381421 A1* | 12/2016 | Inayatullah | H04N 21/4532 725/132 |
| 2017/0052650 A1* | 2/2017 | Koolwal | H04L 67/36 |
| 2017/0257670 A1* | 9/2017 | Hardt | H04N 21/44218 |

FOREIGN PATENT DOCUMENTS

| | | |
|---|---|---|
| JP | H0651930 A | 2/1994 |
| JP | 2002288135 A | 10/2002 |
| JP | 2015153379 A | 8/2015 |

* cited by examiner

*Primary Examiner* — Scott T Baderman
*Assistant Examiner* — Steve P Golden
(74) *Attorney, Agent, or Firm* — John L. Rogitz

(57) ABSTRACT

Indicators such as visible icons or other objects are presented on a display, with each indicator being associated with a respective profile that defines interactive events for which notifications are desired. Broadcast video is presented along with the indicators, and when an interactive event signal is received, if a profile indicates that a notification for that type of event is desired, the associated indicator is altered in appearance, e.g., by changing color, or motion, or other technique. If a profile does not indicate that the type of event should be notified, the corresponding indicator is not altered in appearance, e.g., can remain grayed out yet still visible.

20 Claims, 4 Drawing Sheets

LIVE INTERACTIVE EVENT INDICATION BASED ON NOTIFICATION PROFILE FOR DISPLAY DEVICE

FIELD

This patent application relates generally to live interactive event indication based on notification profiles for video display devices.

BACKGROUND

The Advanced Television Systems Committee (ATSC) 3.0 standard is an Internet Protocol (IP)-based broadcasting standard that provides end-to-end delivery of IP-based content. While Moving Pictures Expert Group (MPEG) Dynamic Adaptive Streaming over Hypertext Transfer Protocol (DASH) is an appropriate protocol for broadband delivery, for unidirectional end-to-end content delivery for broadcasting, ATSC 3.0 supports delivery of files containing the media segments using Real Time Object Delivery Over Unidirectional Transport (ROUTE) protocol, an ATSC 3.0 defined protocol derived from File Delivery Over Unidirectional Transport (FLUTE) protocol defined by Internet Engineering Task Force (IETF). ATSC 3.0 also supports the delivery of media using Moving Picture Experts Group (MPEG) media transport protocol (MMTP).

SUMMARY

As understood herein, ATSC 3.0 supports the delivery of interactive events such as advertisements and other auto-triggered programming events. These events can be instantiated in several ways, such as by an ATSC broadcast (ROUTE/MMT command). However, present principle also apply to delivery of interactive events using transport control protocol/Internet protocol (TCP/IP) to deliver broadband video (with Javascript or Javascript object notation (JSON) commands), or a Cable TV channel in-band signal using, e.g., Data Over Cable Service Interface Specification (DOCSIS) or DOCSIS service gateway (DSG/DOCSIS) commands. The interactive events can be shown to the TV viewer with a program cue or a call to action, such as an overlaid graphical button, typically the letter "i".

As further understood herein, a viewer knows only when an interactive event is present to be considered by means of the program cue or call to action. To know what particular event is on tap, the viewer must interrupt his viewing to click on the cue, which can be particularly annoying when the event is one that is not of interest to the particular viewer.

Accordingly, a notification profile, typically associated with a particular viewer, can be represented by an on-screen icon or graphical object appearing over a program stream, menu template, or a tile within a pop-up TV interface, separate from the interactive trigger. The profile icon can be selectively made visible to the viewer during a broadcast session to signal live that an action is pending a response. Moreover, the state of a live event available for response can be specialized using the users profile, based upon what type of immediate responses are programmed into that event by a broadcaster. Examples include responding to a coupon offer from an ad or sending a future programming reminder from a cross-promo ad or sending an instant message to make a vote or comment. Through the user's active profile, the user decides what actions to take for each event. There may be more than one choice to respond to an interactive TV opportunity. Thus, the response can be personalized and the syntax of the response by the user varied based on how the profile is set-up. Responses are then dynamic and individualized.

The interactive, live, smart profile that is visible on a smart TV is a communication beacon for a TV. It operates to inform a viewer so as to limit interruption of the TV viewing experience, and to quickly manage responses based on preset configurations for interactivity. The live profile also has personalized communication capabilities to deliver in home messages to other devices on the same home network. So, in addition to tracking one's profile of content preferences, it can serve as one's personal digital identity when interacting through the TV.

According to present principles, smart graphics can be live and automated and dynamic, not just playing a video when a cursor hovers over it but delivering live notices to viewers without being clicked, by showing different colors or other means of state changes described below. This aids the decision making of viewers as to whether to disrupt their TV watching to respond to an event or not. Present principles allow for customized notices and customized responses, including sending messages to other smart devices in the home using a home network. A smart profile can inform the viewer how many events he has in a queue, how many have been saved, and other tallies that tie back to programming or web events. It also can serve as a library for event management.

Present principles thus notify viewers of interactive events based on using a common TV trigger. The response to the trigger may be based on the program being viewed, the type of TV operating system, and the functionality it allows. Event types can vary and may not have to be controlled or curated by the content or broadcaster only. Events can be delivered independently over IP, non-live, disassociated and non-contiguous with the actual viewing opportunities. Events such a sending a video to a hard drive for recording may be based on live viewing. Sending a future show reminder request or sending an instant chat message to a family member in the home can be discontinuous. The active user profile can be depicted as a differentially colored icon on screen that indicates to the current viewer that there is an action to take, what actions are available, if the action is live or not, etc. Thus, the state of the icon may include lit or unlit, and what color it is to cue the viewer what interactive action is being sought. For example, green might mean a live event is asking for a response and is available for selecting. A blue lit profile icon may mean a message is pending from a family member in the home. The icon state may be tied to an interactive trigger on the TV or may have other actions available such as an instant messaging (IM), depending on what items the viewer selects in his profile and what color the viewer has selected to apply to what action. An icon representing the active user profile of the person viewing the content can be specialized to different semi-transparent colors or highlights to inform the viewer what types of actions are possible currently. Highlighting or clicking on the profile icon then activates selectable actions for that live content or current state of the TV. A persistent light "behind" or surrounding the icon can signify that the profile is active and "online". A brighter highlight around the icon can be for navigation purposes. Right clicking on the icon may be used to show what additional options or actions are available at the moment that are not related to the content being viewed, such as a general message being sent to someone in the home. Hovering over or highlighting an icon can show event-based live actions, while selecting the icon may open up the total available actions. In essence, the visible user profile depicted by an interactive icon is smart and knows when a program has gone interactive, and what options are available when an event is triggered by a program or the user.

The smart user profile with customized notification and communication capabilities selectively informs users of TV states, allows for event triggers to be responded to, and serves to customize content opportunities such as with a Multiview environment. Multiview TV can be made active by broadcasters to allow access to special live feeds of content that can be simultaneously viewed along with primary live broadcasts. These curated live view templates can be populated based on personalized profiles that TV content creators can use in a standard manner to personalize content viewing while delivering mass audience adoption.

In an embodiment, an apparatus includes a least one computer storage that is not a transitory signal and that has instructions executable by at least one processor to present on at least one display assembly at least one user interface (UI) including a current video window configured to present video received from a source of broadcast video and at least first and second indicators associated with respective first and second notification profiles. The instructions are executable to receive a signal representing at least a first interactive event, and to use the signal representing at least a first interactive event and information in the first and second notification profile to determine whether to alter a state of presentation of the respective first and second indicators.

The indicators may be visible indicators, and the state of presentation can include one or more color, size, motion, flashing. Or, the display assembly may include at least one video display and at least one speaker, and the indicators can be audible indicators presented on the at least one speaker. The audible indicators may be various types of music each of which is associated with a particular interactive feature, or spoken words declaring what interactive feature has just become available, etc.

In some examples, the instructions are executable to, responsive to the signal representing at least the first interactive event and information in the first notification profile correlating the first interactive event to a notification, alter the state of presentation of the first indicator, and responsive to the second notification profile not correlating the first interactive event to a notification, not alter the state of presentation of the second indicator. In such implementations, the instructions may be executable to, responsive to a signal representing at least a second interactive event and information in the first notification profile not correlating the second interactive event to a notification, not alter the state of presentation of the first indicator, and responsive to the second notification profile correlating the second interactive event to a notification, alter the state of presentation of the second indicator.

If desired, the instructions can be executable to, along with the first and second indicators and the current video window, present on the display assembly at least one region selectable to access the first interactive event.

In another aspect, a method includes receiving broadcast video, presenting the video on at least one display, and presenting plural indicators on the display. The method includes receiving a signal representing at least one interactive event. The method further includes, responsive to the signal, accessing profiles associated with respective indicators, and based on information in the profiles, determining whether to alter a state of the respective indicators to indicate the at least one interactive event.

In another aspect, an apparatus includes at least one display assembly, at least one processor, and at least one computer storage accessible to the processor with instructions to configure the processor to present on the display assembly plural indicators, with each indicator being associated with a respective profile that defines interactive events for which notifications are desired. The instructions are executable to, responsive to receiving a signal indicating an interactive event during presentation of broadcast content on the display assembly, access the profiles. The instructions are further executable to, responsive to a profile indicating that a notification for the interactive event is desired, alter a state of the respective associated indicator, and responsive to a profile indicating that a notification for the interactive event is not desired, not alter a state of the respective associated indicator.

The details of the present application, both as to its structure and operation, can best be understood in reference to the accompanying drawings, in which like reference numerals refer to like parts, and in which:

DETAILED DESCRIPTION

Figure 1:
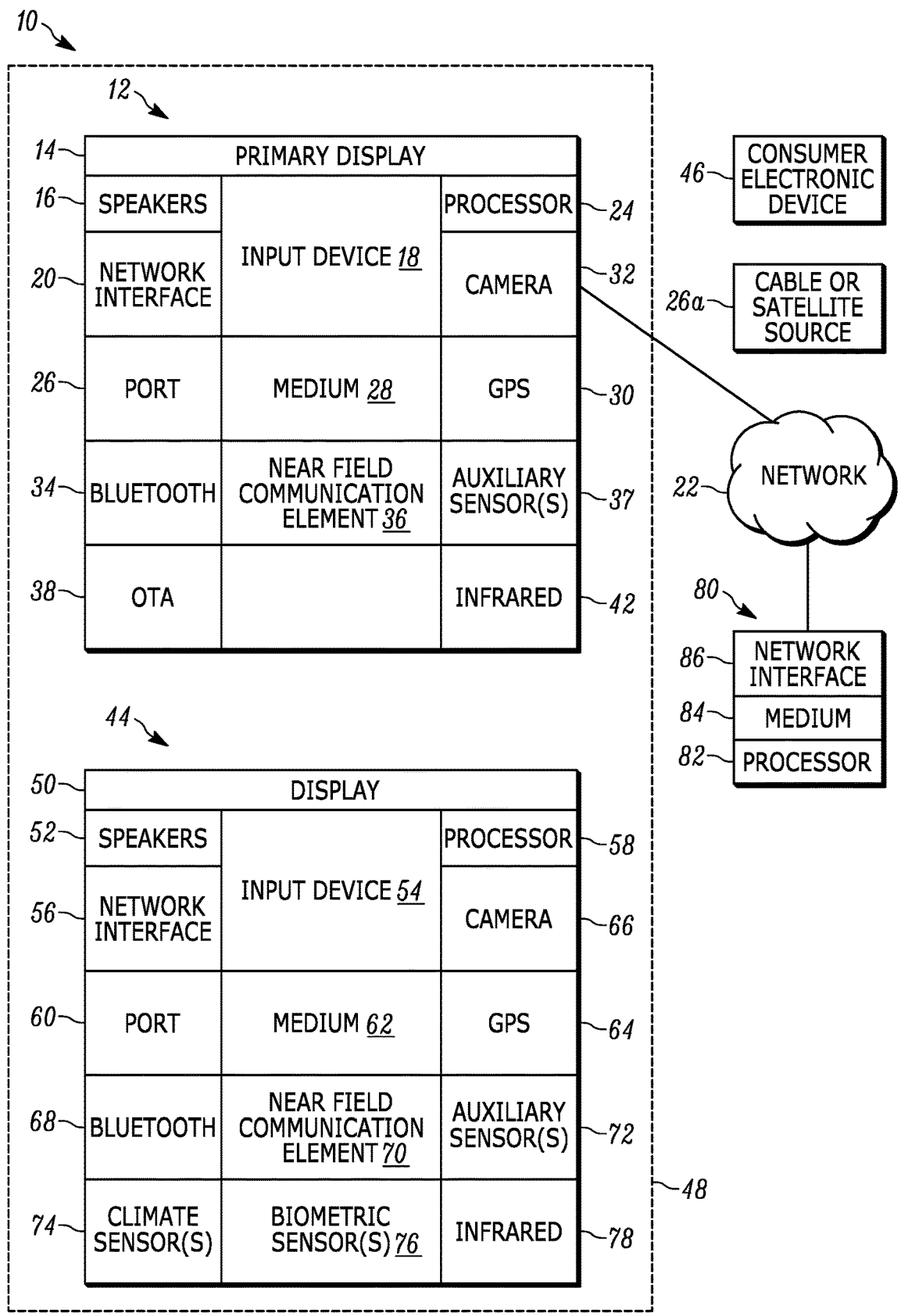
FIG. 1 is a block diagram of an example system including an example in accordance with present principles.

This disclosure relates generally to computer ecosystems including aspects of computer networks that may include consumer electronics (CE) devices. A system herein may include server and client components, connected over a network such that data may be exchanged between the client and server components. The client components may include one or more computing devices including portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, operating systems from Microsoft, or a Unix operating system, or operating systems produced by Apple Computer or Google. These operating environments may be used to execute one or more browsing programs, such as a browser made by Microsoft or Google or Mozilla or other browser program that can access websites hosted by the Internet servers discussed below.

Servers and/or gateways may include one or more processors executing instructions that configure the servers to receive and transmit data over a network such as the Internet. Or, a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security.

As used herein, instructions refer to computer-implemented steps for processing information in the system. Instructions can be implemented in software, firmware or hardware and include any type of programmed step undertaken by components of the system.

A processor may be any conventional general-purpose single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits described below can be implemented or performed with a general-purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to C # or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example ecosystem 10 is shown, which may include one or more of the example devices mentioned above and described further below in accordance with present principles. The first of the example devices included in the system 10 is a consumer electronics (CE) device configured as an example primary display device, and in the embodiment shown is an audio video display device (AVDD) 12 such as but not limited to an Internet-enabled TV with a TV tuner (equivalently, set top box controlling a TV). The AVDD 12 may be an Android®-based system. The AVDD 12 alternatively may also be a computerized Internet enabled ("smart") telephone, a tablet computer, a notebook computer, a wearable computerized device such as e.g. computerized Internet-enabled watch, a computerized. Internet-enabled bracelet, other computerized Internet-enabled devices, a computerized Internet-enabled music player, computerized Internet-enabled head phones, a computerized Internet-enabled implantable device such as an implantable skin device, etc. Regardless, it is to be understood that the AVDD 12 and/or other computers described herein is configured to undertake present principles (e.g. communicate with other CE devices to undertake present principles, execute the logic described herein, and perform any other functions and/or operations described herein).

Accordingly, to undertake such principles the AVDD 12 can be established by some or all of the components shown in FIG. 1. For example, the AVDD 12 can include one or more displays 14 that may be implemented by a high definition or ultra-high definition "4K" or higher flat screen and that may or may not be touch-enabled for receiving user input signals via touches on the display. Present principles are particularly useful for the circumstance in which the display 14 is not touch-enabled. The AVDD 12 may include one or more speakers 16 for outputting audio in accordance with present principles, and at least one additional input device 18 such as e.g. an audio receiver/microphone for e.g. entering audible commands to the AVDD 12 to control the AVDD 12. The example AVDD 12 may also include one or more network interfaces 20 for communication over at least one network 22 such as the Internet, an WAN, an LAN, a PAN etc. under control of one or more processors 24. Thus, the interface 20 may be, without limitation, a Wi-Fi transceiver, which is an example of a wireless computer network interface, such as but not limited to a mesh network transceiver. The interface 20 may be, without limitation a Bluetooth transceiver, Zigbee transceiver, IrDA transceiver, Wireless USB transceiver, wired USB, wired LAN, Powerline or MoCA. It is to be understood that the processor 24 controls the AVDD 12 to undertake present principles, including the other elements of the AVDD 12 described herein such as e.g. controlling the display 14 to present images thereon and receiving input therefrom. Furthermore, note the network interface 20 may be, e.g., a wired or wireless modem or router, or other appropriate interface such as, e.g., a wireless telephony transceiver, or transceiver as mentioned above, etc.

In addition to the foregoing, the AVDD 12 may also include one or more input ports 26 such as, e.g., a high definition multimedia interface (HDMI) port or a USB port to physically connect (e.g. using a wired connection) to another CE device and/or a headphone port to connect headphones to the AVDD 12 for presentation of audio from the AVDD 12 to a user through the headphones. For example, the input port 26 may be connected via wire or wirelessly to a cable or satellite source 26a of audio video content. Thus, the source 26a may be, e.g., a separate or integrated set top box, or a satellite receiver. Or, the source 26a may be a game console or disk player containing content that might be regarded by a user as a favorite for channel assignation purposes described further below.

The AVDD 12 may further include one or more computer memories 28 such as disk-based or solid-state storage that are not transitory signals, in some cases embodied in the chassis of the AVDD as standalone devices or as a personal video recording device (PVR) or video disk player either internal or external to the chassis of the AVDD for playing back AV programs or as removable memory media. Also, in some embodiments, the AVDD 12 can include a position or location receiver such as but not limited to a cellphone receiver, GPS receiver and/or altimeter 30 that is configured to e.g. receive geographic position information from at least one satellite or cellphone tower and provide the information to the processor 24 and/or determine an altitude at which the AVDD 12 is disposed in conjunction with the processor 24. However, it is to be understood that that another suitable position receiver other than a cellphone receiver, GPS receiver and/or altimeter may be used in accordance with present principles to e.g. determine the location of the AVDD 12 in e.g. all three dimensions.

Continuing the description of the AVDD 12, in some embodiments the AVDD 12 may include one or more cameras 32 that may be, e.g., a thermal imaging camera, a digital camera such as a webcam, and/or a camera integrated into the AVDD 12 and controllable by the processor 24 to gather pictures/images and/or video in accordance with present principles. Also included on the AVDD 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the AVDD 12 may include one or more auxiliary sensors 37 (e.g., a motion sensor such as an accelerometer, gyroscope, cyclometer, or a magnetic sensor, an infrared (IR) sensor for receiving IR commands from a remote control, an optical sensor, a speed and/or cadence sensor, a gesture sensor (e.g. for sensing gesture command), etc.) providing input to the processor 24. The AVDD 12 may include an over-the-air TV broadcast port 38 for receiving OTA TV broadcasts providing input to the processor 24. In addition to the foregoing, it is noted that the AVDD 12 may also include an infrared (IR) transmitter and/or IR receiver and/or IR transceiver 42 such as an IR data association (IRDA) device. A battery (not shown) ay be provided for powering the AVDD 12.

Still referring to FIG. 1, in addition to the AVDD 12, the system 10 may include one or more other computer device types that may include some or all of the components shown for the AVDD 12. In one example, a first device 44 and a second device 46 are shown and may include similar components as some or all of the components of the AVDD 12. Fewer or greater devices may be used than shown.

In the example shown, to illustrate present principles all three devices 12, 44, 46 are assumed to be members of a local network in, e.g., a dwelling 48, illustrated by dashed lines.

The example non-limiting first device 44 may include one or more touch-sensitive surfaces 50 such as a touch-enabled video display for receiving user input signals via touches on the display. The first device 44 may include one or more speakers 52 for outputting audio in accordance with present principles, and at least one additional input device 54 such as e.g. an audio receiver/microphone for e.g. entering audible commands to the first device 44 to control the device 44. The example first device 44 may also include one or more network interfaces 56 for communication over the network 22 under control of one or more processors 58. Thus, the interface 56 may be, without limitation, a Wi-Fi transceiver, which is an example of a wireless computer network interface, including mesh network interfaces. It is to be understood that the processor 58 controls the first device 44 to undertake present principles, including the other elements of the first device 44 described herein such as e.g. controlling the display 50 to present images thereon and receiving input therefrom. Furthermore, note the network interface 56 may be, e.g., a wired or wireless modem or router, or other appropriate interface such as, e.g., a wireless telephony transceiver, or Wi-Fi transceiver as mentioned above, etc.

In addition to the foregoing, the first device 44 may also include one or more input ports 60 such as, e.g., a HDMI port or a USB port to physically connect (e.g. using a wired connection) to another computer device and/or a headphone port to connect headphones to the first device 44 for presentation of audio from the first device 44 to a user through the headphones. The first device 44 may further include one or more tangible computer readable storage medium 62 such as disk-based or solid-state storage. Also in some embodiments, the first device 44 can include a position or location receiver such as but not limited to a cellphone and/or GPS receiver and/or altimeter 64 that is configured to e.g. receive geographic position information from at least one satellite and/or cell tower, using triangulation, and provide the information to the device processor 58 and/or determine an altitude at which the first device 44 is disposed in conjunction with the device processor 58. However, it is to be understood that that another suitable position receiver other than a cellphone and/or GPS receiver and/or altimeter may be used in accordance with present principles to e.g. determine the location of the first device 44 in e.g. all three dimensions.

Continuing the description of the first device 44, in some embodiments the first device 44 may include one or more cameras 66 that may be, e.g., a thermal imaging camera, a digital camera such as a webcam, etc. Also included on the first device 44 may be a Bluetooth transceiver 68 and other Near Field Communication (NFC) element 70 for communication with other devices using Bluetooth and/or NFC technology, respectively. An example NFC element can be a radio frequency identification (RFID) element.

Further still, the first device 44 may include one or more auxiliary sensors 72 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), etc.) providing input to the CE device processor 58. The first device 44 may include still other sensors such as e.g. one or more climate sensors 74 (e.g. barometers, humidity sensors, wind sensors, light sensors, temperature sensors, etc.) and/or one or more biometric sensors 76 providing input to the device processor 58. In addition to the foregoing, it is noted that in some embodiments the first device 44 may also include an infrared (IR) transmitter and/or IR receiver and/or IR transceiver 42 such as an IR data association (IRDA) device. A battery may be provided for powering the first device 44. The device 44 may communicate with the AVDD 12 through any of the above-described communication modes and related components.

The second device 46 may include some or all of the components described above.

Now in reference to the afore-mentioned at least one server 80, it includes at least one server processor 82, at least one computer memory 84 such as disk-based or solid state storage, and at least one network interface 86 that, under control of the server processor 82, allows for communication with the other devices of FIG. 1 over the network 22, and indeed may facilitate communication between servers, controllers, and client devices in accordance with present principles. Note that the network interface 86 may be, e.g., a wired or wireless modem or router, transceiver, or other appropriate interface such as, e.g., a wireless telephony transceiver.

Accordingly, in some embodiments the server 80 may be an Internet server and may include and perform "cloud" functions such that the devices of the system 10 may access a "cloud" environment via the server 80 in example embodiments. Or, the server 80 may be implemented by a game console or other computer in the same room as the other devices shown in FIG. 1 or nearby.

The devices described below may incorporate some or all of the elements described above.

The above methods may be implemented as software instructions executed by a processor, suitably configured application specific integrated circuits (ASIC) or field programmable gate array (FPGA) modules, or any other convenient manner as would be appreciated by those skilled in those art. Where employed, the software instructions may be embodied in a non-transitory device such as a CD ROM or Flash drive. The software code instructions may alternatively be embodied in a transitory arrangement such as a radio or optical signal, or via a download over the internet.

Figure 2:
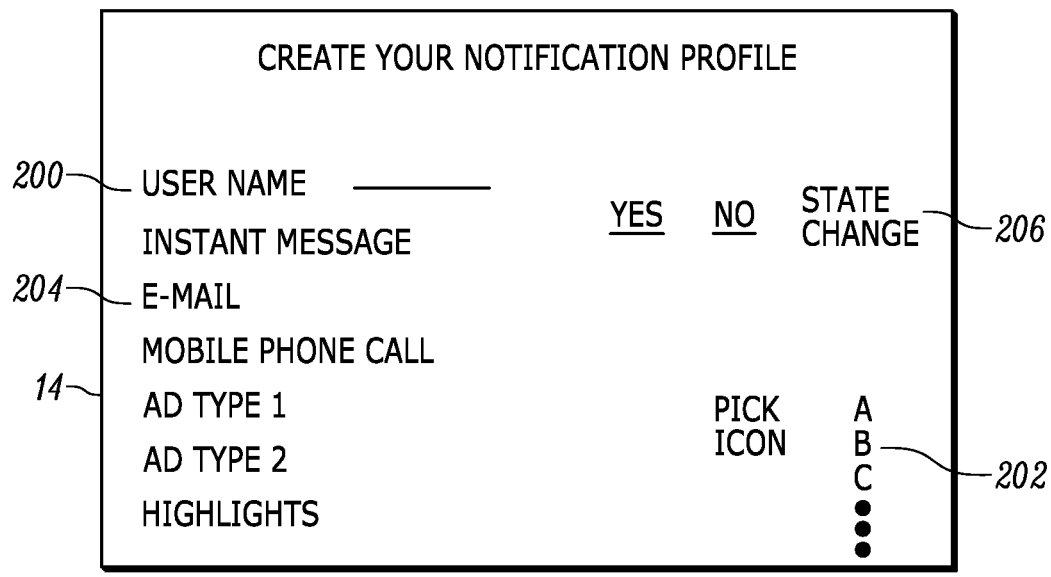
FIG. 2 is a screen shot of an example user interface (UI) to set up a notification profile.

FIG. 2 shows a non-limiting example of a UI that may be used by a viewer to set up a notification profile. The user may enter an identity such as a user name or photo (selected from, e.g., a local or remote photo album) or voice input (to be used as a voice fingerprint for voice recognition) into an entry tool 200. The user may also select a notification indicator to associate with his profile using, e.g., a drop-down list 202. Without limitation, indicators available for selection may include icons, photos, video clips, symbols, avatars, etc.

The viewer may also select various types of interactive events he wishes to be notified of from, e.g., a list 204. The events may be, without limitation, any of the interactive events described herein, such as an incoming instant message or email or phone call, or an advertisement of a specific type, e.g., golf products, beauty aids, highlight clips, etc. The viewer may select "yes" or "no" for each type of event and may be provided with a field for inputting a custom description of an event for which notifications are (or are not) desired.

The UI may include an input 206 for the viewer to indicate a desired state change of the selected notification indicator (202) as a notification. The viewer may select a single state change type for all events the viewer has selected to be notified of, or the viewer may select a state change for each particular event that is different from the state change selected for other events. Without limitation, an indicator may be selected to change state from visible but grayed out and motionless when no events are pending that the viewer has selected to be notified of, to, upon detection of an incoming event the viewer has selected to be notified of, a different color of the indicator, a different (e.g., larger) size of the indicator, blinking or flashing of the indicator, movement of the indicator (e.g., spinning or vibrating).

Note that the indicators herein may alternatively be audible, with selections of state changes and indicator types mentioned above being provided along the lines discussed.

Figure 3:
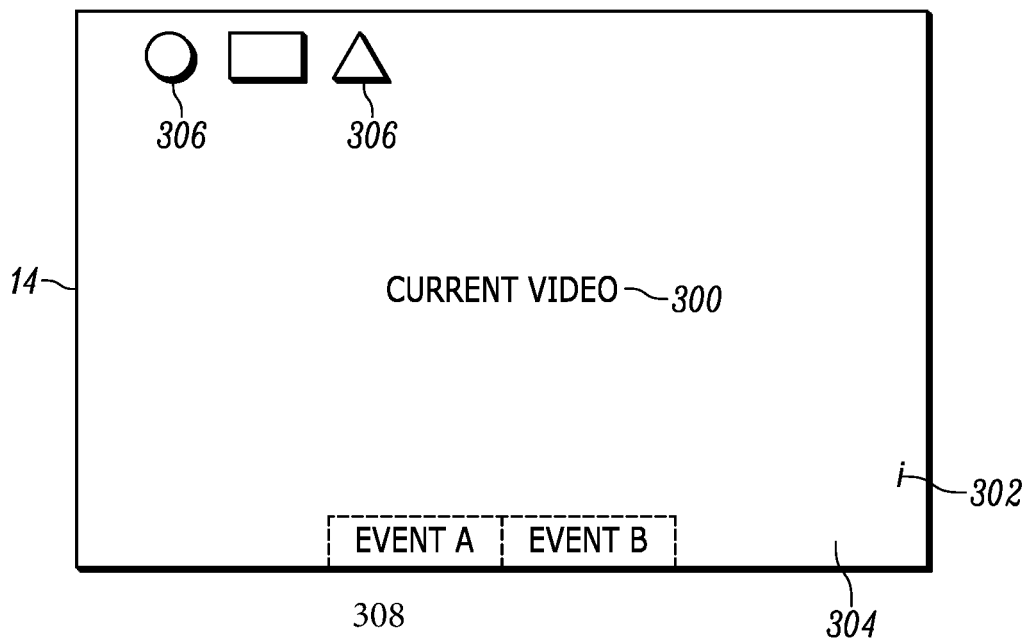
FIG. 3 is a screen shot of an example presentation of three notification indicators for live events.
Figure 4:
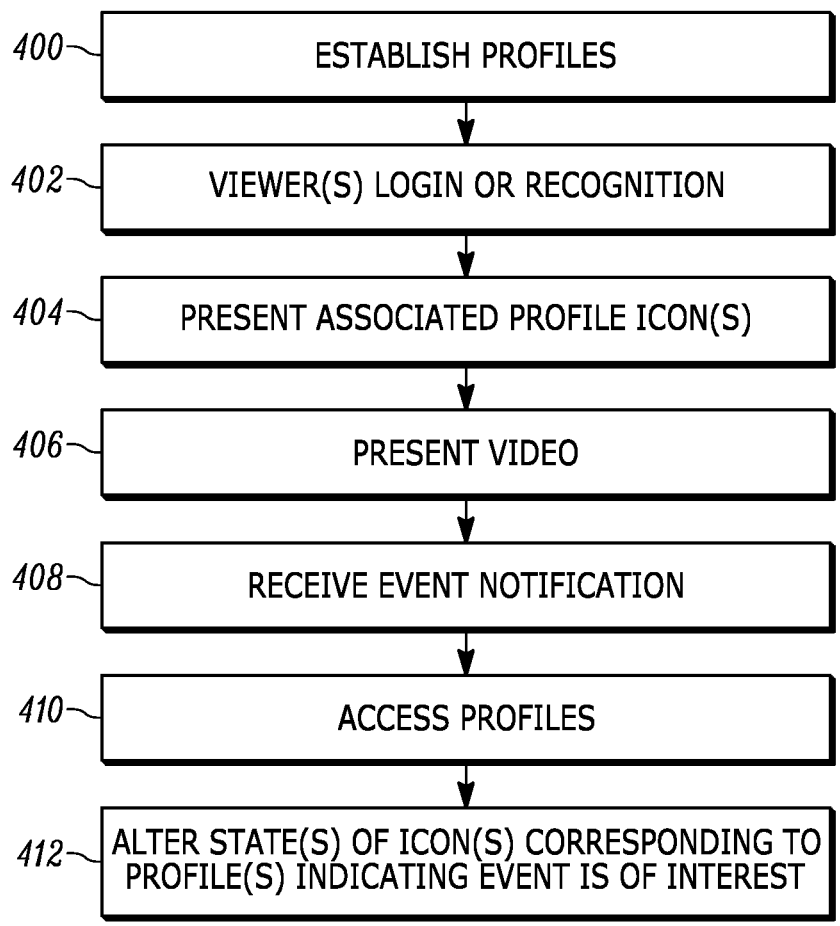
FIG. 4 is a flow chart of example logic consistent with present principles.

FIGS. 3 and 4 illustrate operating principles. In FIG. 3, the display 14 may be used to present current video 300 on substantially the entire video display area. An interactive event symbol 302 such as an italicized version of the letter "i" may be presented in a region 304 that is selectable to access an interactive event. However, the symbol 302 does not indicate what type of interactive event may be available.

Accordingly, as discussed above one or more notification indicators 306 may be presented unobtrusively as shown on the display 14. For ease of understanding the indicators 306 in FIG. 3 are icons each having a different geometric shape from the others, it being understood that other types of indicators as divulged herein may be used. Each indicator 306 is associated with a respective notification profile as might be generated, e.g., using the UI of FIG. 2. An indicator 306 may be presented for each notification profile that the processor of the device has access to, or only for those notification profiles corresponding to viewers who are detected to be present by virtue of, e.g., user log in, face recognition, or voice recognition.

When an indicator 306 indicates, according to principles discussed above and amplified on below, that an interactive event has been received by the display device, a viewer may select the region 304 to cause indications 308 (shown in dashed lines to indicate they appear only when region 304 is selected) of available interactive events to be presented on the display 14. An indication 308 may be selected by, e.g., using a remote commander point and click feature, hovering a screen cursor over it, or other means to cause the interactive event to be presented on the display 14 and/or on another device such as a mobile phone or other computing device that might be coupled to the display 14 using, e.g., Bluetooth.

With the above in mind, turn now to FIG. 4. Commencing at block 400, one or more event notification profiles are established as discussed above in reference to FIG. 2. Each notification profile typically is associated with a respective viewer. Moving to block 402, one or more viewers of a display device presenting video are recognized or otherwise detected, and at block 404 the notification indicator associated with the notification profile of each detected viewer is presented as shown FIG. 3.

Video is presented at block 406 (typically, audio-video content). As the content is received and presented, from time to time interactive event notifications are received by the display device at block 408. As an event notification is received, the logic moves block 410 to access the notification profiles associated with the present viewers (equivalently, with the presented notification indicators 306). Proceeding to block 412, the state of each notification indicator corresponding to a notification profile in which the event/event type received at block 408 is indicated as being of interest (i.e., is to merit notification) is changed as an indication that an event/event type indicated in the profile(s) as being of interest has been received and is available by, e.g., selecting the region 304 in FIG. 3. However, the state(s) of indicator(s) associated with profiles that do not indicate the event/event type received at block 408 is of interest are not changed.

The logic above may be executed by the processor of the display device.

Figure 5:
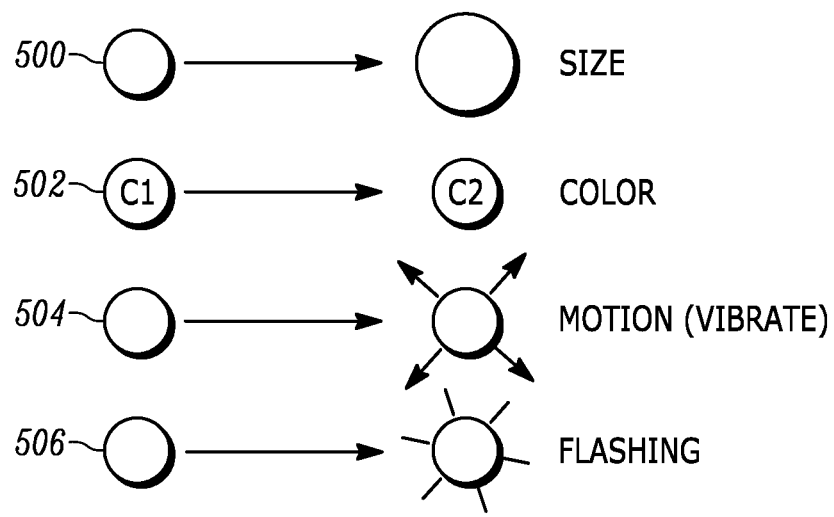
FIG. 5 is a schematic diagram of example state changes for the notification indicators.

FIG. 5 indicates at 500 that an example state change for a notification indicator 306 may be size. FIG. 5 also indicates at 502 that an example state change for a notification indicator 306 may be color (changing color). FIG. 5 further indicates at 504 that an example state change for a notification indicator 306 may be motion (the indicator may change from being motionless to moving). Also, FIG. 5 indicates at 506 that an example state change for a notification indicator 306 may be illumination change, e.g., from grayed out to flashing or blinking, or from illuminated steadily to flashing, etc. Combinations of state changes may be used to indicate various different types of interactive events indicated in the corresponding profile as being of interest.

It will be appreciated that whilst present principals have been described with reference to some example embodiments, these are not intended to be limiting, and that various alternative arrangements may be used to implement the subject matter claimed herein.

What is claimed is:

1. An apparatus, comprising:
   at least one processor configured with instructions to:
   present on at least one display assembly at least one user interface (UI) comprising a current video window configured to present video received from a source of broadcast video and at least first and second indicators associated with respective first and second notification profiles;
   receive a signal representing at least a first interactive event associated with the broadcast video and with which a user can interact using a computer input device; and
   use the signal representing at least a first interactive event and information in the first and second notification profiles to determine whether to automatically alter a state of presentation of the respective first and second indicators responsive to the first interactive event, information in the first profile being used to automatically modify the respective first indicator in a first way responsive to the first interactive event without user intervention and information in the second profile being used to automatically modify, without user intervention, the second indicator in a second way responsive to the first interactive event, the second way being different from the first way.

2. The apparatus of claim 1, comprising the at least one processor.

3. The apparatus of claim 1, comprising the at least one display assembly.

4. The apparatus of claim 1, wherein the indicators are visible indicators.

5. The apparatus of claim 4, wherein the state of presentation comprises at least one of: color, size, motion, flashing.

6. The apparatus of claim 1, wherein the display assembly comprises at least one video display and at least one speaker, and the indicators are audible indicators presented on the at least one speaker.

7. The apparatus of claim 1, wherein the instructions are executable to:
   responsive to the signal representing at least the first interactive event and information in the first notification profile correlating the first interactive event to a notification, alter the state of presentation of the first indicator, and responsive to the second notification profile not correlating the first interactive event to a notification, not alter the state of presentation of the second indicator.

8. The apparatus of claim 7, wherein the instructions are executable to:
   responsive to a signal representing at least a second interactive event and information in the first notification profile not correlating the second interactive event to a notification, not alter the state of presentation of the first indicator, and responsive to the second notification profile correlating the second interactive event to a notification, alter the state of presentation of the second indicator.

9. The apparatus of claim 1, wherein the instructions are executable to:
   along with the first and second indicators and the current video window, present on the at least one display assembly at least one region selectable to access the first interactive event.

10. A method, comprising:
    presenting at least one user interface (UI) on an output device, the at least one UI being configured to:
    permit a user to enter an identity of the user;
    permit the user to associate a first notification indicator with a first profile of the user;
    permit the user to select at least one type of interactive event to be notified of;
    presenting video on at least one display;
    presenting plural notification indicators including the first notification indicator on the display, the user being a first user, plural indicators comprising at least first and second indicators, the first indicator being associated with the first profile of the first user, the second indicator being associated with a second profile of a second user and being independent of the first profile;
    receiving a signal representing the at least one type of interactive event with which a user can interact to respond to the interactive event using a computer input device;
    accessing profiles including the first profile associated with respective indicators; and
    based on information in the profiles, determining whether to automatically without user intervention alter a state of the respective indicators to indicate the at least one interactive event, wherein information in the first profile is used to modify the respective first indicator in a first way responsive to the at least one interactive event and information in the second profile is used to modify the second indicator in a second way different from the first way responsive to the at least one interactive event.

11. The method of claim 10, comprising:
    based on information in a first one of the plural profiles, not altering a state of an indicator associated with the first one of the plural profiles in response to the signal.

12. The method of claim 11, comprising:
    based on information in a second one of the plural profiles, altering a state of an indicator associated with the second one of the plural profiles in response to the signal.

13. The method of claim 10, comprising presenting the indicators visibly.

14. The method of claim 10, comprising presenting the indicators audibly.

15. The method of claim 10, comprising presenting, along with the indicators and the video, at least one region selectable to access the at least one interactive event.

16. Apparatus comprising:
    at least one display assembly;
    at least one processor; and
    at least one computer storage accessible to the processor and comprising instructions to configure the processor to:
    present on at least one display, in a region of the display, an interactive event symbol established by a single character and selectable to access an interactive event, the interactive event comprising an interactive computer event;
    present on the display assembly plural indicators, with each indicator being associated with a respective profile that defines interactive events for which notifications are desired, wherein the indicators comprise first and second indicators associated with respective first and second profiles;

receive a signal indicating an interactive event during presentation of broadcast content on the display assembly;

responsive to a profile indicating that a notification for the interactive event is desired, alter a state of the respective associated indicator;

information in the first profile being used to automatically modify, without user intervention, the respective first indicator in a first way responsive to the interactive event and information in the second profile being used to modify the second indicator in a second way different from the first way responsive to the interactive event; and responsive to selection of the interactive event symbol subsequent to altering an indicator, present at least one indication of an available interactive event.

17. The apparatus of claim 16, wherein at least one of the indicators is visible.

18. The apparatus of claim 16, wherein at least one of the indicators is audible.

19. The apparatus of claim 16, wherein the instructions configure the processor to:

along with the indicators, present on the at least one display assembly at least one region selectable to access the interactive event.

20. The apparatus of claim 16, wherein the state is a state of presentation comprising at least one of: color, size, motion, flashing.

* * * * *